(12) United States Patent
Woodall (10) Patent No.: US 9,269,129 B1
(45) Date of Patent: Feb. 23, 2016

(54) TWO-DIMENSIONAL DIGITAL TRANSIENT IMPROVEMENT

(71) Applicant: Pixelworks, Inc., Portland, OR (US)

(72) Inventor: Neil Woodall, Newport Beach, CA (US)

(73) Assignee: Pixelworks, Inc., Portland, OR (US)

( * ) Notice: Subject to any disclaimer, the term of this patent is extended or adjusted under 35 U.S.C. 154(b) by 133 days.

(21) Appl. No.: 14/106,366

(22) Filed: Dec. 13, 2013

(51) Int. Cl.
*G06K 9/40* (2006.01)
*G06T 5/00* (2006.01)

(52) U.S. Cl.
CPC ...................... *G06T 5/003* (2013.01)

(58) Field of Classification Search
CPC ... H04N 7/012; H04N 7/0135; H04N 7/0142; H04N 5/142; G06T 3/40; G06T 3/403

USPC .......................................................... 382/266
See application file for complete search history.

(56) References Cited

U.S. PATENT DOCUMENTS

| | | | |
|---|---|---|---|
| 8,369,653 B1 * | 2/2013 | Cohen ........................... | 382/299 |
| 2005/0134730 A1 * | 6/2005 | Winger et al. ................. | 348/448 |
| 2010/0067818 A1 * | 3/2010 | Zhang et al. .................. | 382/260 |

* cited by examiner

*Primary Examiner* — Ali Bayat
(74) *Attorney, Agent, or Firm* — Marger Johnson (57) ABSTRACT

A method can include receiving an input signal that includes an input image having an original edge, applying multiple one-dimensional (1D) Digital Transient Improvement (DTi) algorithms to the input image, summing each result of the application of each of the 1D DTi algorithms to the input image, and providing an output signal that includes an output image having an enhanced edge that results from the applying and summing and corresponds to the original edge.

19 Claims, 7 Drawing Sheets

TWO-DIMENSIONAL DIGITAL TRANSIENT IMPROVEMENT

CROSS-REFERENCE TO RELATED APPLICATION

This application is related to co-pending U.S. patent application Ser. No. 14/106,448, titled IMAGE DETAIL ENHANCEMENT AND EDGE SHARPENING WITHOUT OVERSHOOTING and filed on Dec. 13, 2013, the content of which is fully incorporated by reference herein.

TECHNICAL FIELD

The disclosed technology pertains to graphics processing, and more particularly to techniques pertaining to two-dimensional (2D) Digital Transient Improvement (DTi).

BACKGROUND

After the upscaling of a smaller image for display on high-resolution devices, edges within the upscaled image are often blurry (or blurrier) compared to images that are at the correct resolution or a higher resolution. In order to create sharper edges, image processing routines can use sharper scaling filters or a peaking circuit subsequent to the scaler. However, both of these techniques result in edges that have ringing (e.g., a thin ghosting or outline along sharp edges). In order to create sharp edges without ringing, non-linear edge enhancement or Digital Transient Improvement (DTi) algorithms are typically used.

Figure 1:
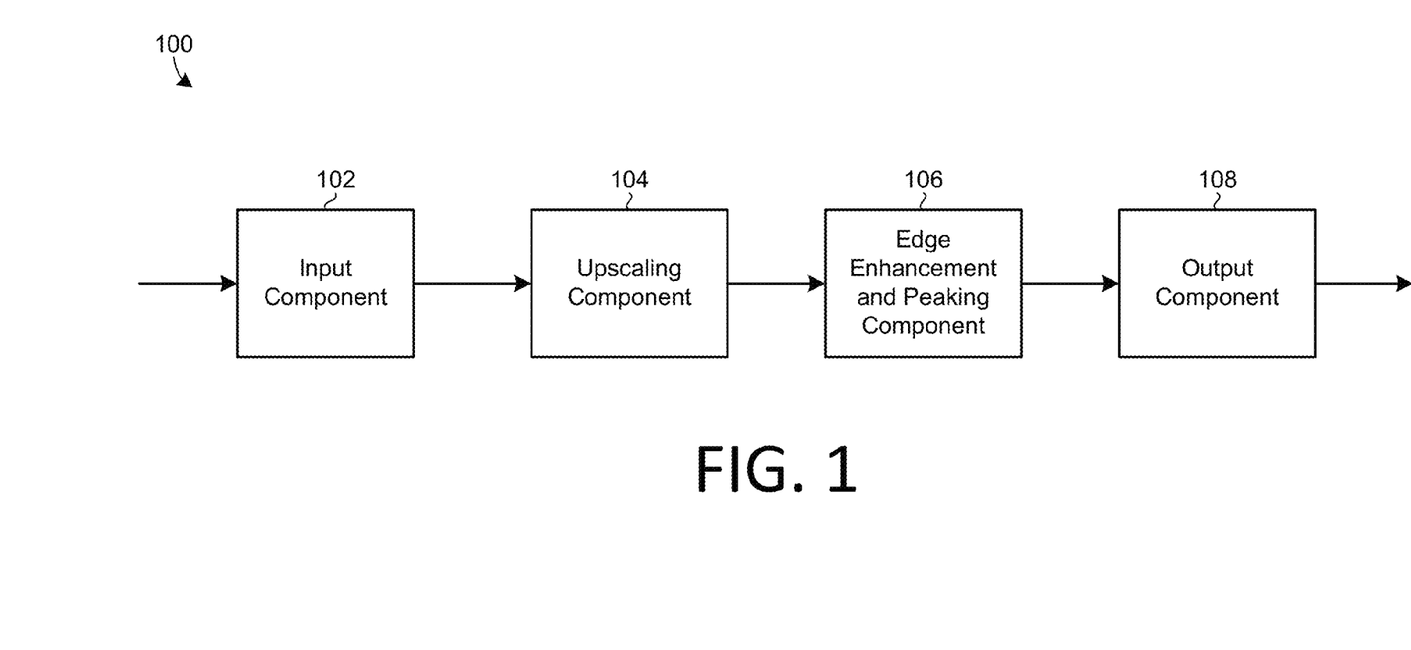
FIG. 1 illustrates an example of a current Digital Transient Improvement (DTi) system having an upscaling component and an edge enhancement and peaking component.

FIG. 1 illustrates an example of a DTi system 100 in which a signal is received by an input component 102 and then upscaled by way of a scaling component 104. The upscaled signal is then processed by an edge enhancement and peaking component 106. The resulting signal is then transmitted by an output component 108.

Traditional one-dimensional (1D) Digital Transient improvement (DTi) algorithms are generally designed to provide additional sharpness along edges without introducing overshoot (e.g., overcorrection) or ringing (e.g., halo effect). However, this is a non-linear process that, when applied to edges that are not orthogonal to the filter, generally causes the edges to be overly processed, resulting in a non-smooth image (e.g., having jaggedness effects referred to as "jaggies") instead of a smooth image.

There are several techniques that have been applied to provide edge enhancement without overshoot. For example, one technique includes the performing of a peaking operation on the signal and subsequently eliminating the ringing by way of a median filter. Such a median filter is applied to the peaked signal, a delayed version of the original signal, and an advanced version of the original signal. An example of this technique is illustrated by FIGS. 2A-2C, which are described below.

Figure 2A:
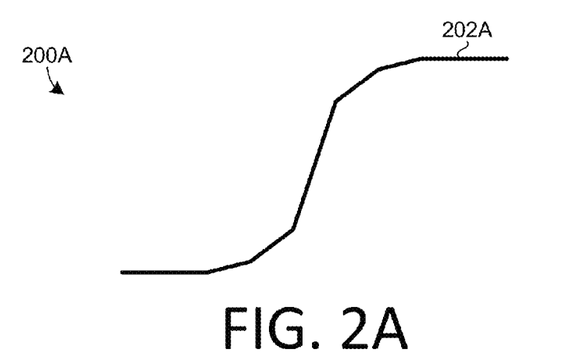
FIGS. 2A-2C illustrate an example of a current technique that includes the performing of a peaking operation on a signal and subsequently eliminating ringing by way of a median filter.
Figure 2B:
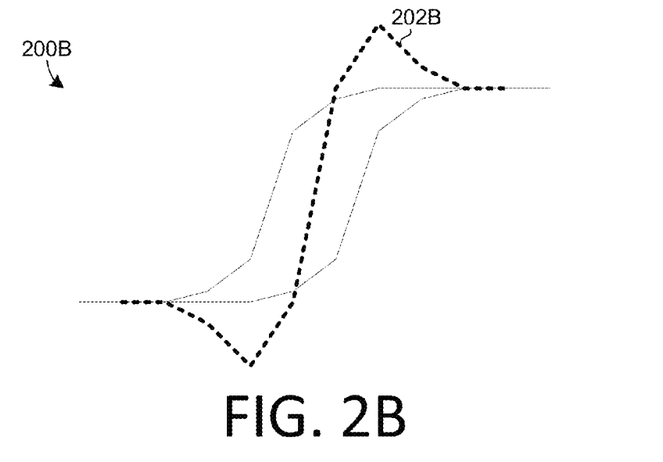
Figure 2C:
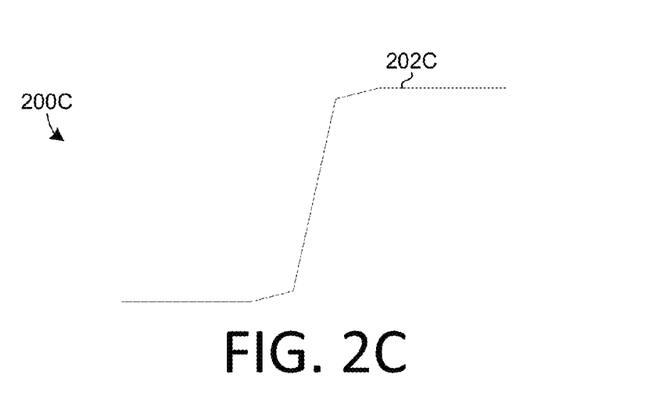

FIG. 2A illustrates a first signal capture 200A in which there is an edge 202A, before application of any peaking or filtering to the corresponding signal. FIG. 2B illustrates a second signal capture 200B in which there is an edge 202B representing the edge 202A of FIG. 2A after peaking and delayed and advanced versions thereof. FIG. 2C illustrates a third signal capture 200C in which there is a media filter result 202C corresponding to the original edge 202A of FIG. 2A.

An additional technique is described in U.S. Pat. No. 7,590,302 ("the '302 patent), which describes an image edge enhancement system and method. The '302 patent is hereby incorporated by reference herein.

While the techniques noted above may be effective for horizontal and vertical edges, such processes tend to degrade image quality in situations where image edges are at an odd angle.

Figure 3A:
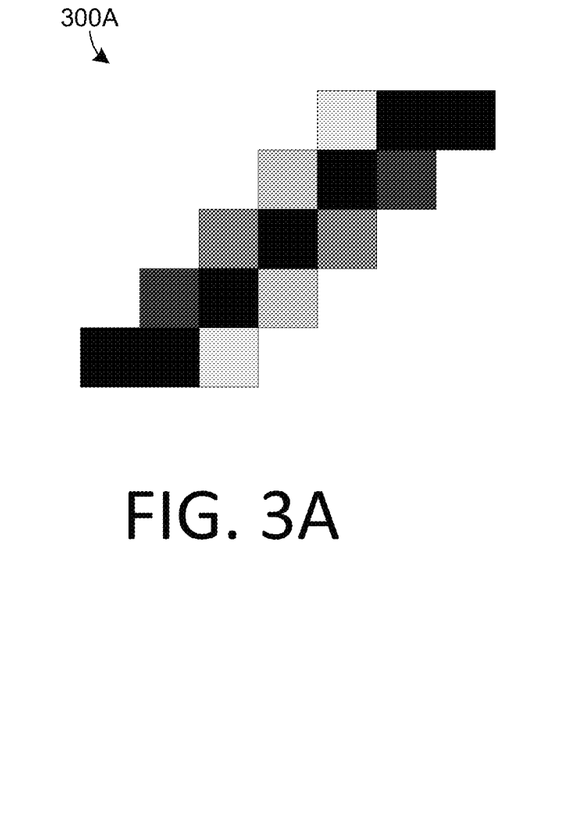
FIGS. 3A-3B illustrate an example of the impact of applying a 1D DTi algorithm to a proper anti-alias edge.
Figure 3B:
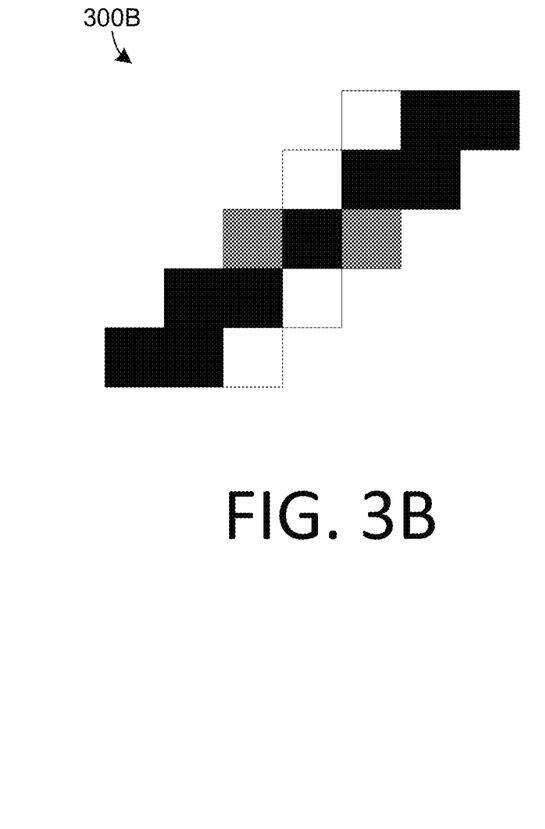

FIGS. 3A-3B illustrate an example of the impact of applying a 1D DTi algorithm to a proper anti-alias edge. Whereas an edge 300A (FIG. 3A) has a smooth appearance, a resulting edge 300B (FIG. 3B) represents the edge 300A of FIG. 3A no longer having a smooth appearance due to such applying.

Traditional methods of adjusting a given technique based on the angle of the edge are complex due to the inherent difficulty in determining the angle itself. Further, the filter becomes more complex when the angles are not 0, 45, 90, or 135 degrees. Also, simply applying two 1D DTi algorithms at 0 and 90 degrees is likely to further increase the amount of jaggedness, e.g., vis a vis simply applying one algorithm or the other.

Accordingly, there remains a need for improved DTi techniques.

DETAILED DESCRIPTION

Rather than attempting to calculate the angle of an image edge directly, certain embodiments of two-dimensional (2D) Digital Transient Improvement (DTi) techniques described here take advantage of the overall goal of the process. In particular, it should be noted that, in situations where edge enhancement is applied in orthogonal directions, the proper direction to use would be the direction having the sharpest transient so that gradients correctly associated with any anti-aliasing of the edge are not impacted. This is also the same direction that provides the largest change (i.e., delta) to the pixel in question.

However, this is typically not enough information to guide the selection of the pertinent DTi algorithm. For example, whereas both the horizontal and vertical directions are equally sufficient at providing enhancement at 45 and 135 degree angles, such level of enhancement is likely to be different due to the impact of optical blur, scaling, or other operations in the chain of operations from capturing the content to displaying the content.

Improved techniques may be directed to optimization of the DTi function for 45 and 135 degree directions and creation of a function of the 0 and 90 degree DTi directions that is zero at those angles. In order to get a zero response at 45 and 135 degrees, for example, one approach may include reducing the magnitude of the maximum delta in the orthogonal directions (e.g., 0 or 90 degrees) by the minimum delta in both of those directions. By adding the diagonal and the horizontal/vertical DTi responses together, a DTi response that does not depend on the angle of the edge may be created.

Figure 4:
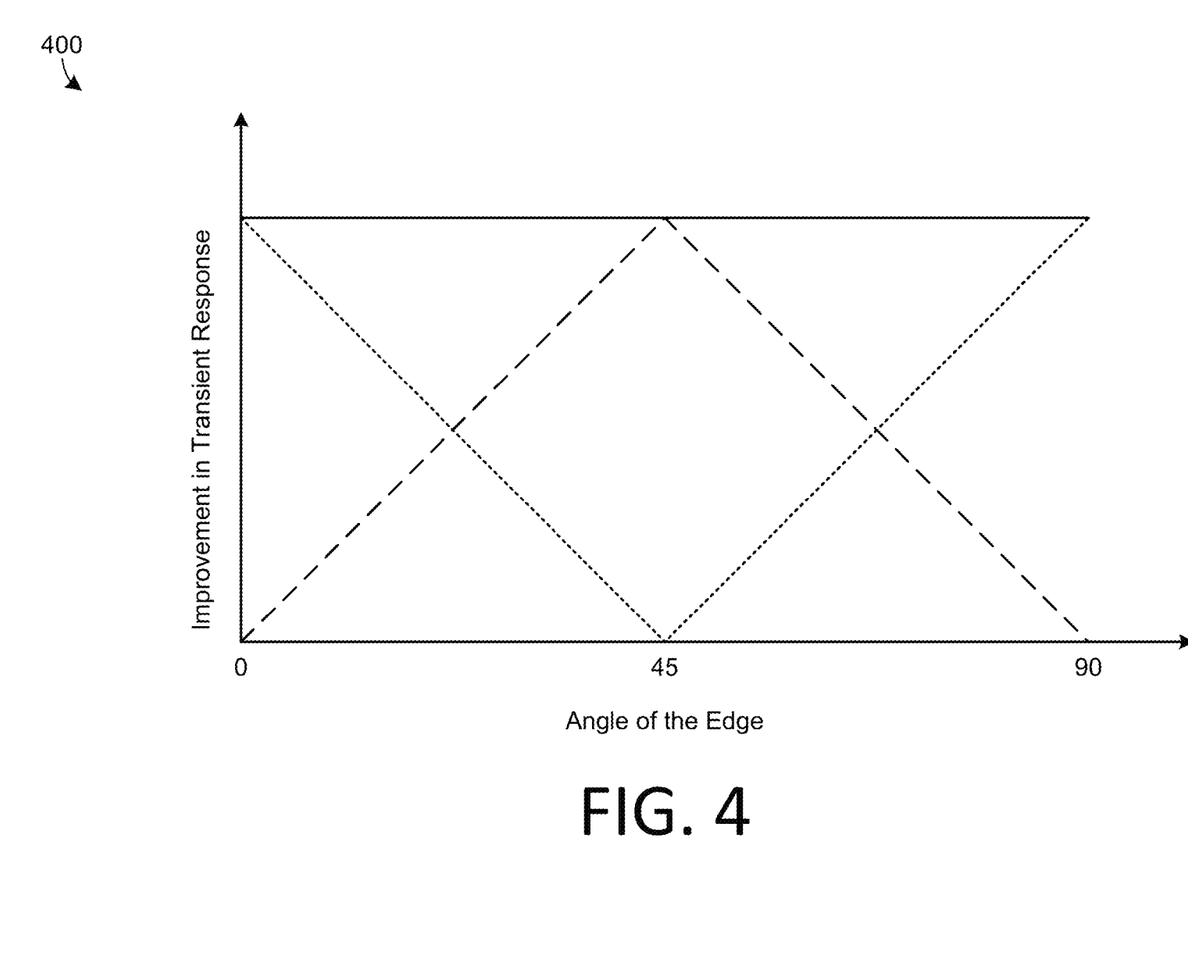
FIG. 4 represents an example of a graph that plots improvement in transient response over the angle of the edge.

FIG. 4 represents an example of a graph 400 that plots improvement in transient response over the angle of the edge. In the example, the graph 400 may be generated by the following DTi algorithm:

if(abs(deltaH_DTi)>abs(deltaV_DTi)
      if(deltaH_DTi>0)
        DeltaHV_DTi=DeltaH_DTi−abs(DeltaV_DTi)
      else
        DeltaHV_DTi=DeltaH_DTi+abs(DeltaV_DTi)
    else
      if(deltaV_DTi>0)
        DeltaHV_DTi=DeltaV_DTi+abs(DeltaH_DTi)
      else
        DeltaHV_DTi=DeltaVD_Ti+abs(DeltaH_DTi)

where deltaH_DTi and deltaV_DTi refer to horizontal and vertical responses, respectively.

Figure 5:
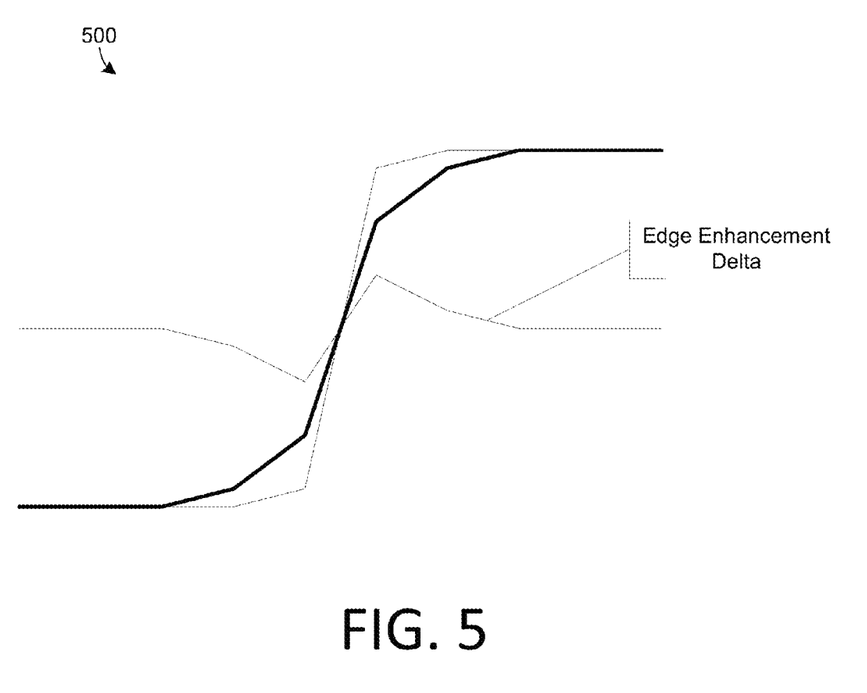
FIG. 5 illustrates an example of an edge enhancement delta that corresponds to the DTi algorithm associated with FIG. 4.

FIG. 5 illustrates an example 500 of an edge enhancement delta represented by the deltaH_DTi and deltaV_DTi noted above.

In other embodiments, a similar technique may be used to calculate a DeltaDia_DTi value (e.g., diagonal response), with the final 2D DTi result being the following:

Pixel_out=Pixel_in+DeltaHV_DTi+DeltaDia_DTi

Figure 6:
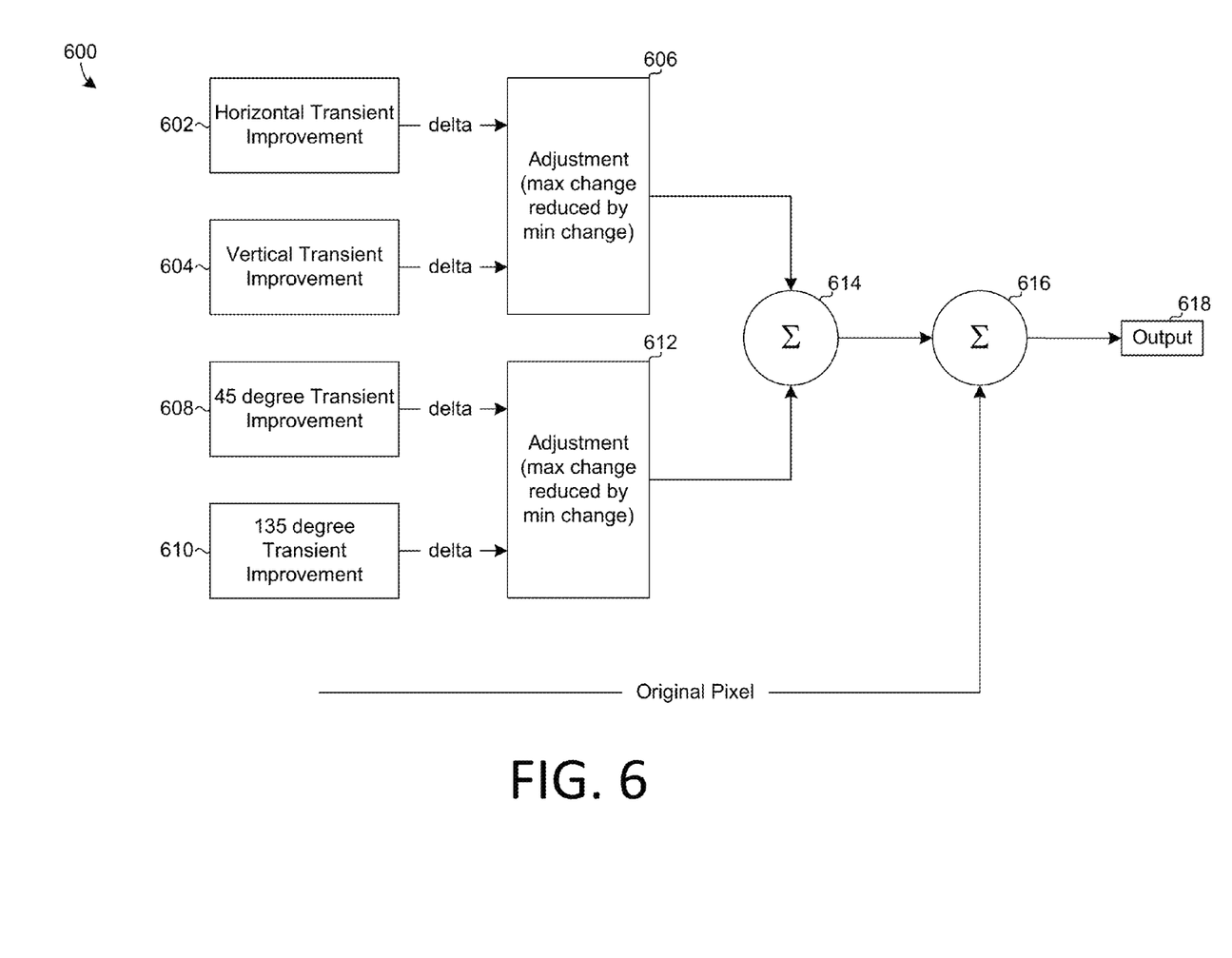
FIG. 6 is a block diagram illustrating an example 600 that implements this 2D DTi algorithm.

FIG. 6 is a block diagram illustrating an example 600 that implements this 2D DTi algorithm. In the example 600, the respective deltas for a horizontal DTi 602 and a vertical DTi 604 are passed to a first adjustment component 606 that performs an operation in which the maximum change is reduced by the minimum change. The respective deltas for a 45 degree DTi 608 and a 135 degree DTi 610 are passed to a second adjustment component 612 that performs an operation in which the maximum change is reduced by the minimum change.

The resulting outputs of the first and second adjustment components 606 and 612 are passed to a first summing component 614, the output of which is sent along with the original pixel to a second summing component 616, the output 618 of which represents the resulting enhanced signal.

In certain situations, the DTi technique can be complex. One method to simplify a 2D DTi algorithm is by noting that, if the final goal of the technique is to avoid overshoot or ringing in the output, then the maximum amount of sharpness that can be added to an edge is related to the gradient or $1^{st}$ derivative of that edge (see, e.g., U.S. Pat. No. 7,590,302, which is incorporated herein). In such a case, the gradient (and, thus, direction to be used) will be the largest one as reduced by the smallest one. The adjusted gradient may then be used instead of the original in the DTi calculation. The adjusted gradient may be represented by the following operations:

Delta_DTi=f($1^{st}$ derivative, $2^{nd}$ derivative)
    Adj_$1^{st}$ derivative=max($1^{st}$ derivative H,$1^{st}$ derivative V)−min($1^{st}$ derivative H,$1^{st}$ derivative V)
    Delta_DTi=f(Adj_$1^{st}$ derivative, $2^{nd}$ derivative)

The result of this 2D DTi process may be combined with a 2D peaking algorithm, e.g., one that is optimized for random texture but is not aggressive enough to cause overshooting on edges. This may allow the two functions to share the line delays that are generally required for a 2D filter operation.

Figure 7:
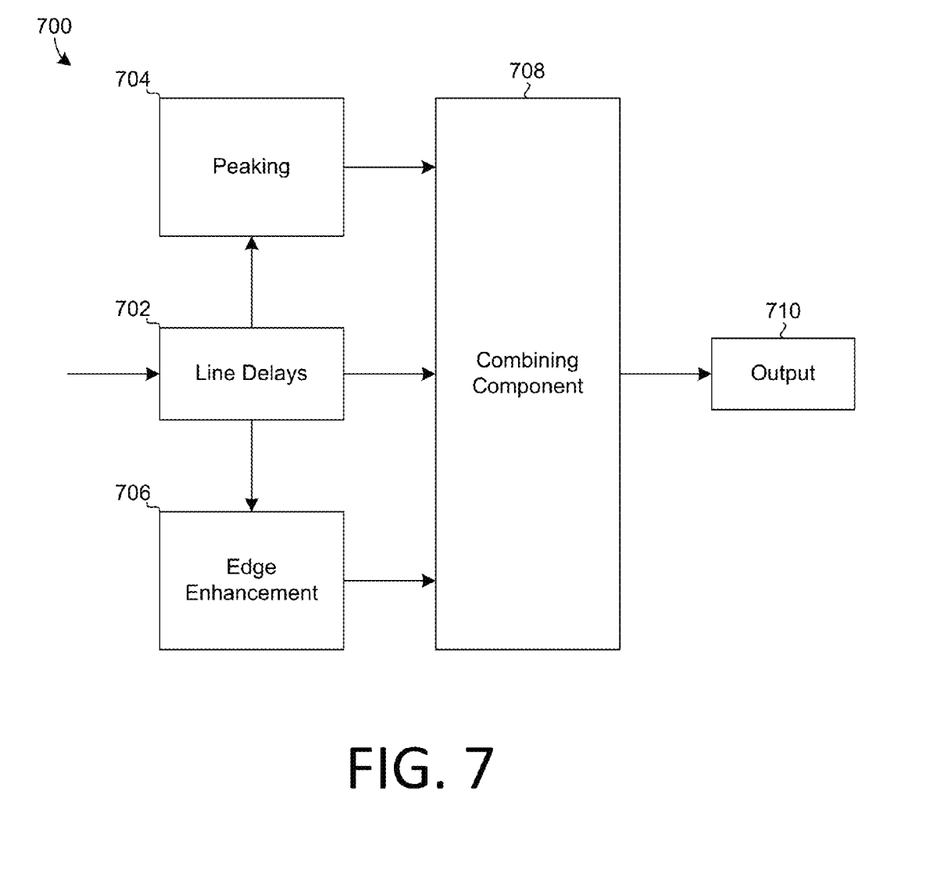
FIG. 7 illustrates an example in which line delays are incorporated into peaking, edge enhancement, and the combination thereof.

FIG. 7 illustrates an example 700 in which line delays 702 are incorporated into both peaking 704 and edge enhancement 706 as well as the combination thereof as performed by a combining component 708, which may transmit the resulting output 710.

A combination process such as that illustrated by FIG. 7 may take one of several different forms. For example, a percentage of the edge enhancement output might be subtracted from the peaking output so that the peaking output is smaller when the edge enhancement process is adjusting the image. The adjusted peaking output may then be added to the edge enhancement output.

In certain embodiments, the maximum change may be used if both changes are in the same direction; otherwise, the two changes may be added together. So long as the edge enhancement algorithm provides larger changes on the edges than those resulting from the peaking, such approaches generally ensure that there will be no ringing.

The following discussion is intended to provide a brief, general description of a suitable machine (e.g., projector system) in which embodiments of the disclosed technology can be implemented. Typically, the machine includes a system bus to which are attached processors, memory (e.g., random access memory (RAM), read-only memory (ROM), or other state preserving medium), storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal.

The machine may include embedded controllers, such as programmable or non-programmable logic devices or arrays, Application Specific Integrated Circuits (ASICs), embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Embodiments of the disclosed technology may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other tangible storage devices and non-transitory storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the disclosed technology with reference to described embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the disclosed technology" or the like are used herein, these phrases are meant to generally reference embodiment possibilities, and are not intended to limit the invention to any particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A method, comprising:
    receiving an input signal that includes an input image having an original edge therein;
    applying a plurality of one-dimensional (1D) Digital Transient Improvement (DTi) algorithms to the input image, wherein the plurality of 1D DTi algorithms includes a horizontal DTi algorithm and a vertical DTi algorithm;
    determining a delta value corresponding to the horizontal DTi algorithm;
    determining a delta value corresponding to the vertical DTi algorithm;
    summing each result of the application of each of the plurality of 1D DTi algorithms to the input image, wherein the summing includes performing a first adjustment based on the delta value corresponding to the horizontal DTi algorithm and the delta value corresponding to the vertical DTi algorithm; and
    providing an output signal that includes an output image having an enhanced edge that results from the applying and summing and corresponds to the original edge.

2. The method of claim 1, wherein the plurality of 1D DTi algorithms further includes a DTi algorithm at 45 degrees and a DTi algorithm at 135 degrees.

3. The method of claim 2, further comprising:
    determining a delta value corresponding to the DTi algorithm at 45 degrees; and
    determining a delta value corresponding to the DTi algorithm at 135 degrees.

4. The method of claim 3, wherein the summing further includes performing a second adjustment based on the delta value corresponding to the DTi algorithm at 45 degrees and the delta value corresponding to the DTi algorithm at 135 degrees.

5. The method of claim 4, wherein the summing further includes summing an output of the first adjustment and an output of the second adjustment.

6. The method of claim 5, wherein the summing further includes summing the input image with the output of the first adjustment and the output of the second adjustment.

7. One or more tangible, non-transitory computer-readable media storing computer-executable instructions that, when executed by a processor, perform the method recited by claim 1.

8. A method, comprising:
    receiving an input signal that includes an input image having an original edge therein;
    applying a plurality of one-dimensional (1D) Digital Transient Improvement (DTi) algorithms to the input image;
    summing each result of the application of each of the plurality of 1D DTi algorithms to the input image;
    providing an output signal that includes an output image having an enhanced edge that results from the applying and summing and corresponds to the original edge; and
    applying a two-dimensional (2D) peaking algorithm to the input signal and combining the result with the DTi result.

9. The method of claim 8, wherein the combining comprises reducing the 2D peaking amount by a percentage of the DTi amount.

10. The method of claim 8, wherein the combining comprises using the output with the largest magnitude if both outputs are in the same direction.

11. The method of claim 8, wherein the combining comprises adding both outputs if they are not in the same direction.

12. One or more tangible, non-transitory computer-readable media storing computer-executable instructions that, when executed by a processor, perform the method recited by claim 8.

13. A system comprising:
    a display configured to visually present an original image having an edge therein; and
    a processor configured to:
        perform a horizontal Digital Transient Improvement (DTi) algorithm on the original image;
        perform a vertical DTi algorithm on the original image;
        perform a DTi algorithm at 45 degrees on the original image;
        perform a DTi algorithm at 135 degrees on the original image;
        sum results of the horizontal DTi algorithm, the vertical DTi algorithm, the DTi algorithm at 45 degrees, and the DTi algorithm at 135 degrees;
        perform a first adjustment based on a delta value corresponding to an output of the horizontal DTi algorithm and a delta value corresponding to an output of the vertical DTi algorithm; and
        perform a second adjustment based on a delta value corresponding to an output of the DTi algorithm at 45 degrees and a delta value corresponding to an output of the DTi algorithm at 135 degrees.

14. The system of claim 13, wherein the processor is configured to sum the results of the horizontal DTi algorithm, the vertical DTi algorithm, the DTi algorithm at 45 degrees, and the DTi algorithm at 135 degrees by summing results of the first adjustment and the second adjustment.

15. The system of claim 14, wherein the processor is further configured to sum an output of the horizontal DTi algorithm with the original image.

16. The system of claim 13, wherein the processor is further configured to apply a two-dimensional (2D) peaking algorithm to the original image and combine the result with the DTi result.

17. The system of claim 16, wherein the processor is further configured to reduce the 2D peaking amount by a percentage of the DTi result.

18. The system of claim 17, wherein the processor is further configured to use the output with the largest magnitude if both outputs are in the same direction.

19. The system of claim 17, wherein the processor is further configured to add both outputs if they are not in the same direction.

* * * * *

UNITED STATES PATENT AND TRADEMARK OFFICE
CERTIFICATE OF CORRECTION

PATENT NO. : 9,269,129 B1
APPLICATION NO. : 14/106366
DATED : February 23, 2016
INVENTOR(S) : Woodall It is certified that error appears in the above-identified patent and that said Letters Patent is hereby corrected as shown below:

Column 3, line 18, replace "DeltaV_DTi+abs(DeltaH_DTi)" with -- DeltaV_DTi-abs(DeltaH_DTi) --;
Column 3, line 20, replace "DeltaVD_Ti+abs(DeltaH_DTi)" with
-- DeltaV_DTi+dabs(DeltaH_DTi) --.

Signed and Sealed this
Third Day of May, 2016

Michelle K. Lee
*Director of the United States Patent and Trademark Office*